INVENTOR
PIERRE DEMAN
BY
Abraham A. Saffitz
ATTORNEY

INVENTOR
PIERRE DEMAN
BY
Abraham A. Saffitz
ATTORNEY

INVENTOR
PIERRE DEMAN
By Abraham A. Saffitz
ATTORNEY

INVENTOR
PIERRE DEMAN
BY
Abraham A. Saffitz
ATTORNEY

United States Patent Office 3,163,718

Patented Dec. 29, 1964

3,163,718
FREQUENCY AND TIME ALLOCATION MULTIPLEX SYSTEM

Pierre Deman, 56 Rue Fondary, Paris, France

Filed June 28, 1962, Ser. No. 205,976
4 Claims. (Cl. 179—15)

The present invention concerns multiplex systems, that is transmission systems capable of transmitting information signals over sub-channels comprised in a single channel.

Frequency allocation multiplex systems are already known, which are obtained by dividing the frequency bandwidth of a main transmission channel into a number of sub-channels, each sub-channel being allotted the task of transmitting a particular information signal. The sub-channels are juxtaposed within the main channel. On reception, individual sub-channels are separated by filters. With these known systems, while it is desirable, for efficiency's sake, to pack the sub-channels as tightly as possible against one another, it is essential that the frequency juxtaposition be effected without frequency overlapping, in view of preventing inter-frequency sub-channel cross-talk.

Time allocation multiplex systems are already known, which consist in transmitting through a main transmission channel a sequence of pulse signals which are modulated in cyclical permutation with a number of information signals, each corresponding to a sub-channel in said main channel. On reception, individual sub-channels are separated by time allocating or dividing devices. With these known systems, while it is desirable for efficiency's sake to pack the pulses of the sequence as tightly as possible against one another, it is seential that this juxtaposition be effected without time overlapping, in view of inter-time sub-channel cross-talk.

The main drawback of pure frequency multiplex systems is that a severe frequency band limitation in sub-channels involves the use of very long (theoretically infinite) signals. The main drawback of pure time multiplex systems is that they suppose the use of very large (theoretically infinite) bandwidth for the transmission line.

The object of the present invention is to provide a multiplex system, operating as a frequency allocation multiplex system and characterized by the fact that the sub-channels corresponding to the independent information signals present a certain amount of overlapping relatively to one another.

Another object of this invention is a multiplex system characterized by the fact that the elementary signals in a given sub-channel present a certain amount of overlapping with respect to time.

These two objects respectively derive from a more general object, namely the utilization of elementary signals that are not orthogonal relatively to one another.

In brief, a plurality of information signals are recurrently sampled and the samples applied to band-filters having overlapping pass-bands and pass-bands characteristics transforming the samples into elementary signals lasting more than a recurrence period. Then all the elementary signals issuing from the filters are mixed and applied to a communication channel. There results that the composite signal transmitted at a given sampling instant includes contributions from the samples of all the information signals and that for a given information signal, the contributions are obtained not only from the sample of this signal at said given sampling instant but also from samples of the same at earlier sampling instants. Due to the fact that the Laplace transform is a linear operation, the samples of the composite signal are related to samples of the information signals at a plurality of sampling instants by linear relationships and consequently the sample of a given information signal at a given instant can be derived from samples of the composite signal at a plurality of sampling instants by matrical analysis.

According to the invention, a frequency and time allocation multiplex system includes a transmitter and a receiver; said transmitter comprises means for simultaneously and recurrently sampling a plurality of $\mu$ modulation signals and producing input recurrent modulated sample pulses, a plurality of $\mu$ first resonant symmetrical band-filter means having center frequencies spaced apart from one another and frequency pass-bands overlapping one another, said plurality of first resonant symmetrical band-filter means being equal in number to said modulation signal plurality, means for respectively applying said input recurrent modulated sample pulses to said first band-filter means and deriving therefrom elementary signals, said elementary signals having respectively as their carrier frequencies the center frequencies of said first band-filter means, as their bandwidth the pass-bands thereof and a time-duration comprised between $\nu$ and $(\nu+1)$ times the recurrence period of said recurrent modulated sample pulses and means for adding the elementary signals derived from said first band-filter means and applying the resultant signal to a single transmission channel; said receiver comprises a delay-line having an input connected to said single transmission channel and taps for distributing said resultant signal into $\nu$ delay line outputs, a plurality of $\mu$ second resonant symmetrical band-filter means respectively identical to said first resonant symmetrical band-filter means, connected in parallel to each of said $\nu$ delay line outputs, means for sampling the output signals of said $\mu\nu$ second resonant symmetrical band-filter means and deriving therefrom output recurrent samples whereby said $\mu\nu$ output recurrent samples are related to $\mu\nu$ input samples pulses applied at $\nu$ recurrent sampling cycles to $\mu$ first band-filter means by a matrical constant coefficient relationship, and matrix means having $\mu\nu$ lines connected to said second band-filter means and $\mu$ columns and cross-point elements proportional to said constant coefficients, whereby the modulation signals are restored at the outputs of said columns.

It is known that it is possible to double of the number of sub-channels in either time division multiplex systems by using separate in-phase and quadrature sample pulses which, once amplitude-modulated, can be transmitted independently on the same line, the quadrature pulses often called "imaginary unit pulses" being obtained by differentiation of the in-phase pulses often called "real unit pulses"; in that case, appropriate in-phase and quadrature demodulators must be provided in the receiver.

The new transmitting system hereinafter described is adapted to make use of that property, as well.

The invention will be described in greater detail with reference to the accompanying drawing forming a part of the specification and in which.

Figure 3A:
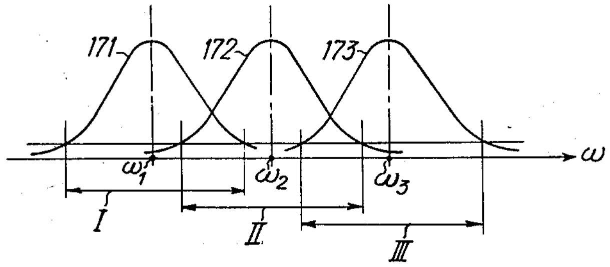
Figure 3B:
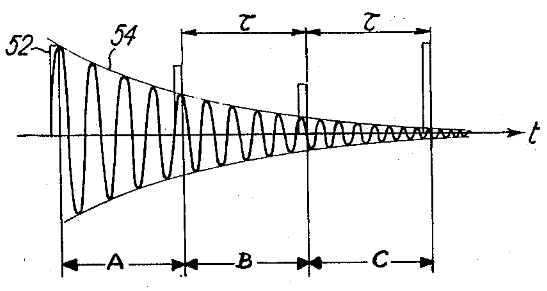
Figure 2:
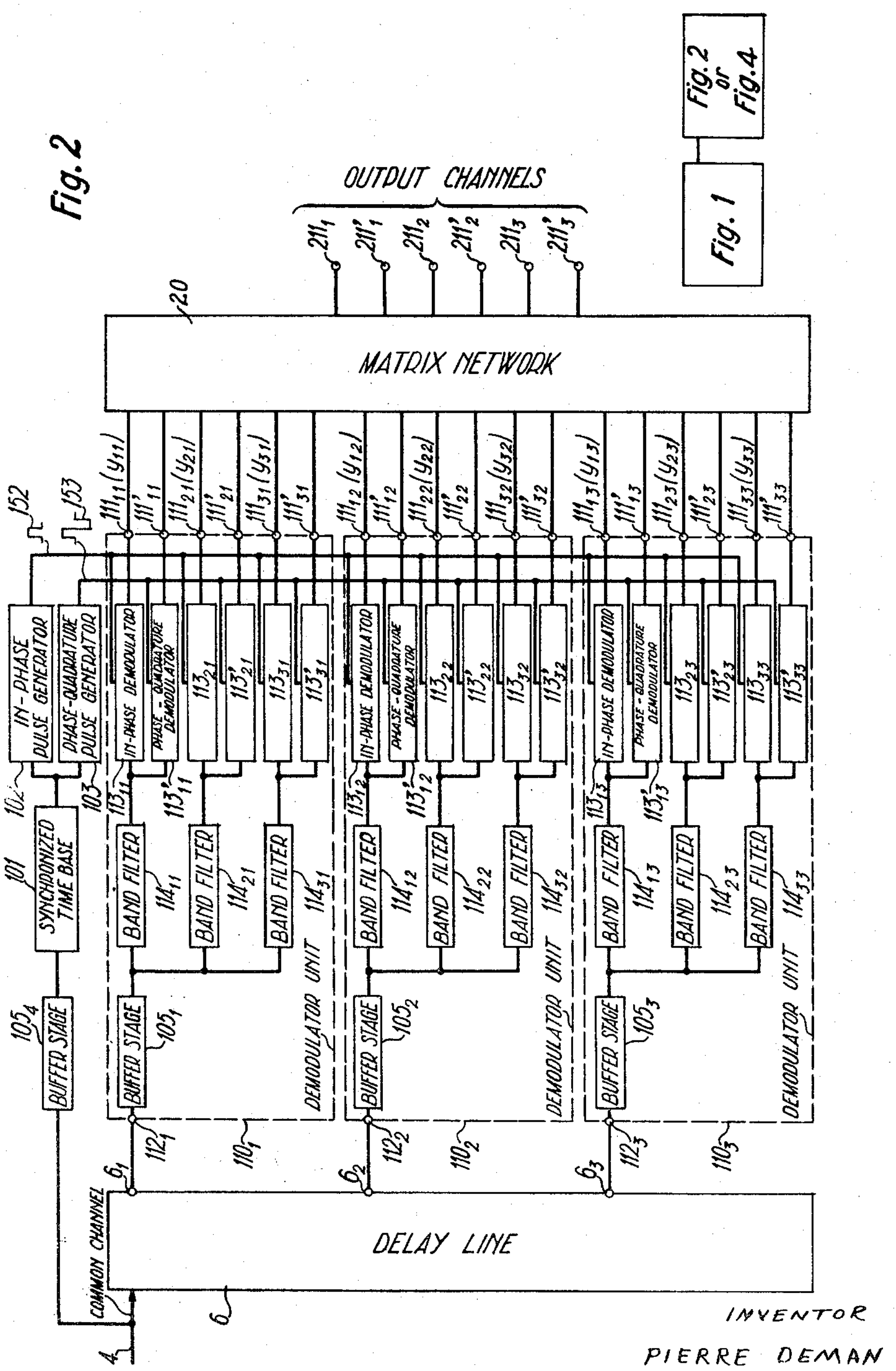
FIG. 2 is a block diagram of a preferred form of multiplex communication receiver system in accordance with the present invention.
Figure 4:
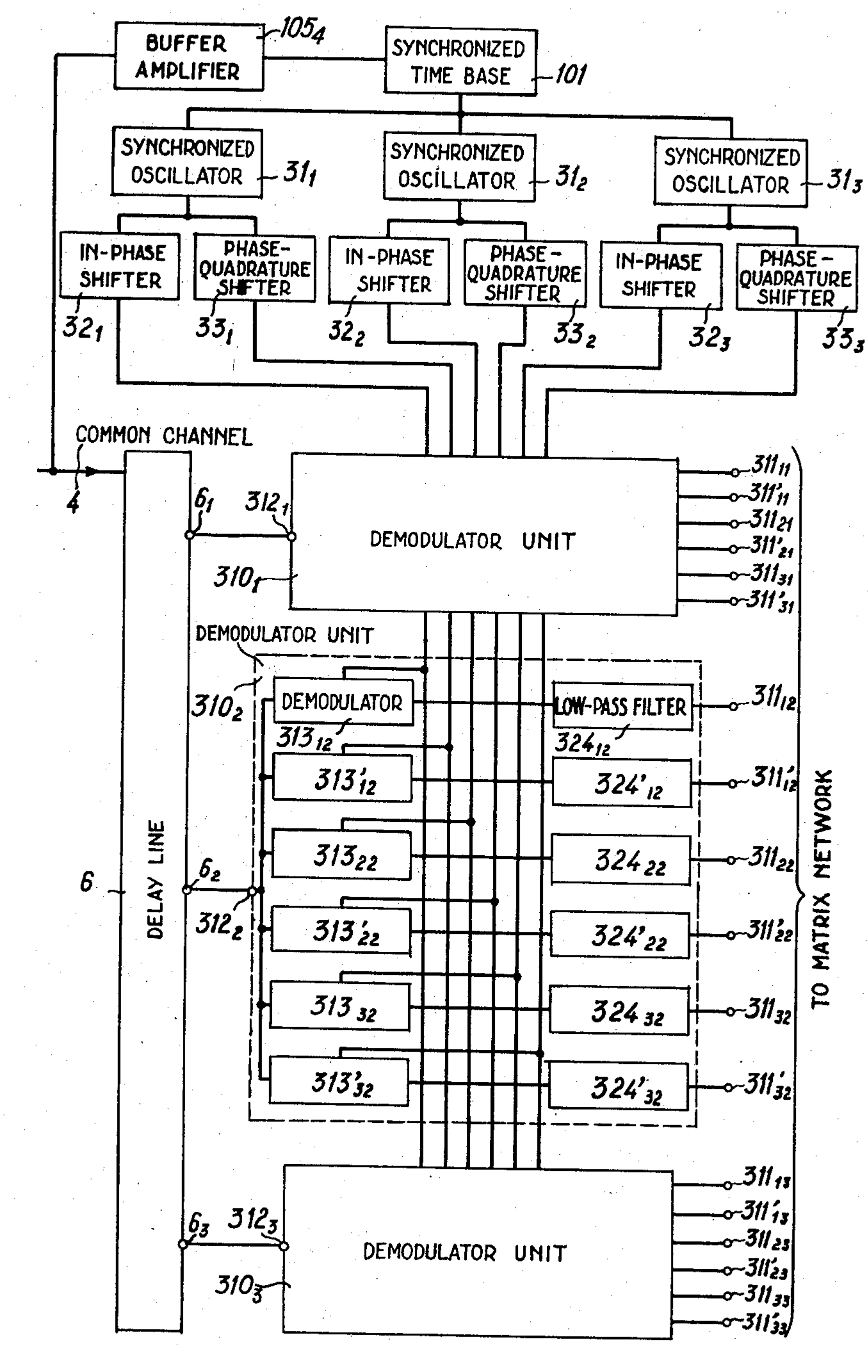
Figure 5:
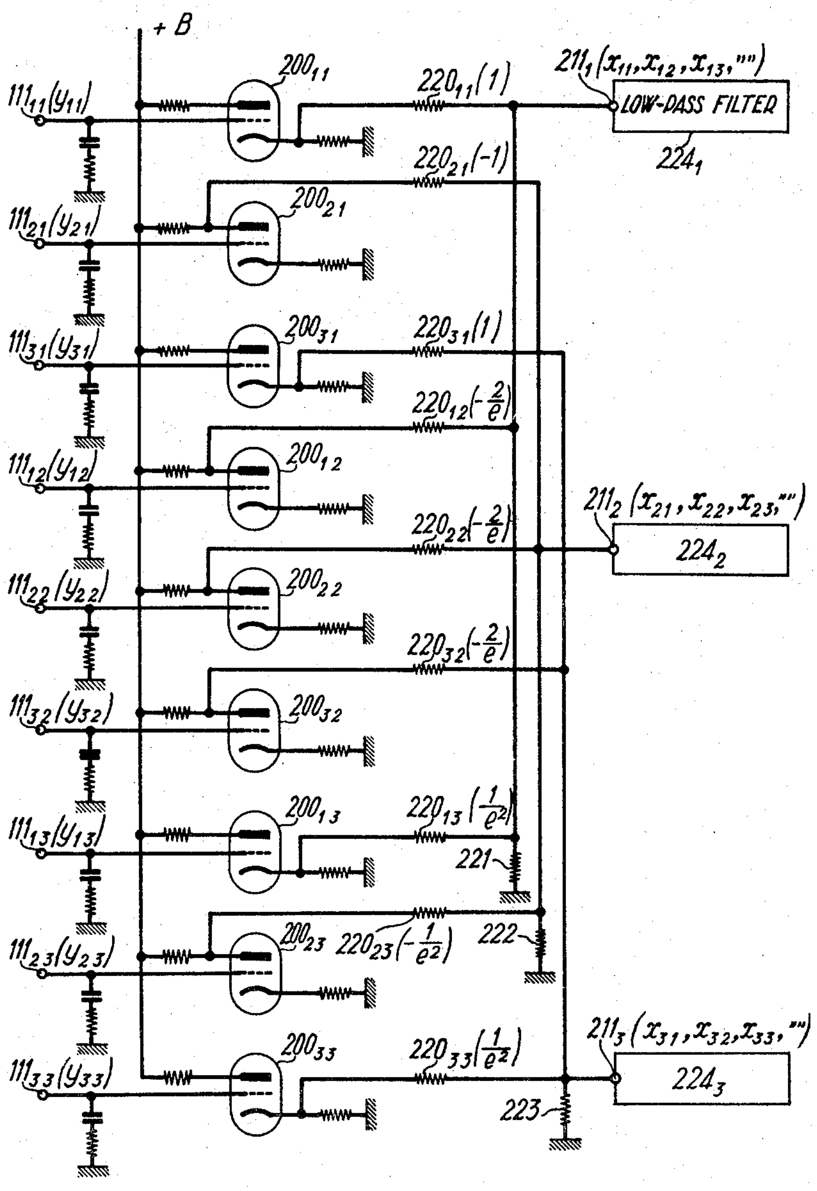

FIG. 3*a* represents the pass-band characteristic curves of the filters used in the transmitter and receiver and shows that the center angular frequencies $\omega_1$, $\omega_2$, $\omega_3$ are spaced apart from one another and the pass-band are overlapping one another; FIG. 3*b* represents a particular waveform for an elementary signal and shows that the duration of said elementary signal is equal to three times the recurrence period $\tau$ of the sampling pulses;

FIG. 4 is a block diagram of a second form of multiplex communication receiver system; and FIG. 5 represents the circuit components of the matrix network of FIG. 2.

Figure 1:
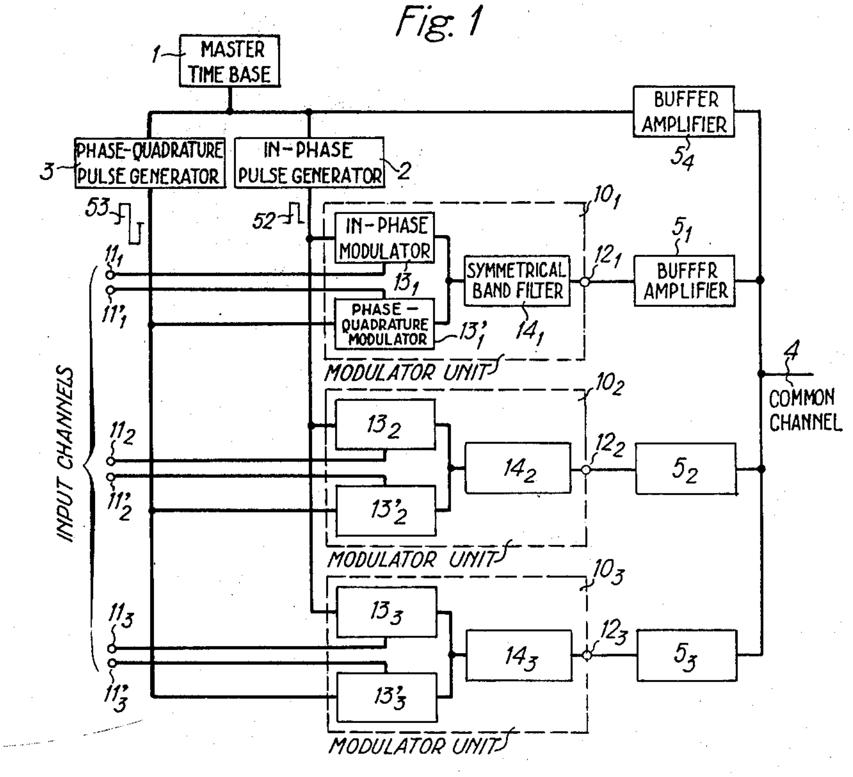
FIG. 1 is a block diagram of a preferred form of multiplex communication transmitter system in accordance with the present invention.

Referring now to FIG. 1 of the drawings, $11_1$, $11_2$, $11_3$, $11'_1$, $11'_2$, $11'_3$ are six input terminals to which are applied separate information signals. Terminals $11_1$ and $11'_1$ are connected to a pulse modulator and filter unit $10_1$ which comprises an in-phase modulator or sampler $13_1$, a phase-quadrature modulator or sampler $13'_1$ and a pass-band filter $14_1$. The central angular frequency of filter $14_1$ is $\omega_1$ and its attenuation curve is shown at 171 in FIG. 3*a*. In a similar manner, terminals $11_2$ and $11'_2$ are connected to pulse modulator and filter unit $10_2$ including samplers $13_2$ and $13'_2$ and filter $14_2$ and terminals $11_3$ and $11'_3$ are connected to pulse modulator and filter unit $10_3$ including samplers $13_3$ and $13'_3$ and filter $14_3$. The central angular frequencies of filters $14_2$ and $14_3$ are respectively $\omega_2$ and $\omega_3$ and the corresponding attenuation curves are represented at 172 and 173 respectively. The output terminals $12_1$, $12_2$, $12_3$ of modulator units $10_1$, $10_2$, $10_3$ are connected to the single communication channel 4 of the system through buffer amplifiers $5_1$, $5_2$ and $5_3$.

The sampling pulses applied to samplers $13_1$, $13_2$, $13_3$ are derived from a pulse generator 2 which will be called "in-phase pulse generator." This generator is driven by master time-base 1 and produces recurrent very short pulses of substantially rectangular waveform 52. In-phase pulse generator 2 may be of the well known synchronized pulse generator type.

The sampling pulses applied to samplers $13'_1$, $13'_2$, $13'_3$ are derived from a pulse generator 3 which will be called "phase-quadrature pulse generator." This generator is also driven by master time-base 1 and products two-pip pulses 53. Phase-quadrature pulse generator 3 may be of the delay line type for example such as illustrated Fig. 55, page 2.100 of "Principles of Radar," McGraw-Hill Book Co., Inc., 1946.

Pulses 52 have a waveform which is theoretically the unit impulse or Dirac function waveform $S_0$ $(t)$ with a finite amplitude. Pulses 53 have a waveform which is theoretically the so-called doublet unit impulse waveform $S_1$ $(t)$. The doublet unit impulse is the derivative of the unit impulse. The unit impulse and the double unit impulse are represented in FIG. 3, right hand column, line n=0 and n=1, page 652 of the article of Campbell in the Bell System Technical Journal, October 28, vol. 7, No. 4, entitled "Practical Application of the Fourier Integral." These functions constitute the pairs 403 and 404 of Table I, page 667 of said article. These two functions are orthogonal with each other and this allows the number of uncoupled communication channels to be doubled.

Filters $14_1$, $14_2$, $14_3$ define frequency channels I, II, III overlapping one another. The attenuation curves 171–173 (FIG. 3*a*) are symmetrical and show that frequency channel II overlaps the two others. It may be said that the frequency channel overlapping ratio is three.

Samplers $13_1$, $13_2$, $13_3$ define time allocations A, B, C . . . of duration $\tau$ $1/\tau$ being the recurrence frequency of the master time-base 1. A sample 52 passing, after being modulated, through filter $14_1$ gives rise to an elementary signal 54 having a duration which lasts several cycle-durations $\tau$ and it will be assumed that the elementary signal duration is comprised between $3\tau$ and $4\tau$. Thus, the number $\nu$ above-referred to is here equal to three.

In the following, the samples of the information signal respectively applied to input channels $11_1$, $11_2$, $11_3$ and set up during the first sampling cycle will be denoted $x_{11}$, $x_{21}$, $x_{31}$, the first subscript relating to the number of the input channel and the second subscript to the number of the sampling cycle. Thus, the sample in channel of number $i$ set up during the $k$th sampling cycle is denoted $x_{ik}$. The elementary signal derived from the sample $x_{ik}$ after it had passed through the filter inserted into input channel of order $i$ will be denoted $x_{ik}$ $a_{i;k}$ where $a_{i;k}$ is a function of time which is nothing different than the inverse Laplace transform of the amplitude-frequency characteristic of the filter and will be explicited later. Already now, it can be noticed that signal 54 has for its carrier frequency the center frequency of the filter from which it is issuing, for its bandwidth the pass-band of the filter and that its duration depends upon the damping factor of the filter. The composite signal in common channel 4 at a given instant, say $3\tau$, is a linear combination of the three elementary signals derived from the three samples taken up at this instant from the information signals in the input channels, from the three samples at a sampling period before and from the three samples at two sampling periods before, i.e. a linear combination of the samples $x_{11}$, $x_{12}$, $x_{13}$, $x_{21}$, $x_{22}$, $x_{23}$, $x_{31}$, $x_{32}$, $x_{33}$.

FIG. 2 illustrates the receiving part of the system. The signal conveyed by transmission line 4 is applied to the input of a delay line 6 which is provided with a number of equidistant taps, three in the specific instance, designated as $6_1$, $6_2$, $6_3$. More generally, this number is equal to the number $\nu$ above referred to. The delay introduced by line 6 between two successive taps is equal to one period $\tau$ of the master time base 1.

Terminals $6_1$, $6_2$, $6_3$ are respectively connected to the input terminals $112_1$, $112_2$, $112_3$ of three demodulators units designated by $110_1$, $110_2$ and $110_3$ which are exactly identical with one another. Each demodulator unit, $110_1$ for example, comprises a buffer amplifier $105_1$, three filters $114_{11}$, $114_{21}$, $114_{31}$ respectively identical to filters $14_1$, $14_2$, $14_3$ of FIG. 1 and connected in parallel to the output of buffer amplifier $105_1$, and samplers $113_{11}$, $113_{21}$, $113_{31}$, $113'_{11}$, $113'_{21}$, $113'_{31}$ respectively identical to samplers $13_1$, $13_2$, $13_3$, $13'_1$, $13'_2$, $13'_3$ of FIG. 1 and connected in parallel by pairs to the outputs of the filters. Samplers $113_{11}$ and $113'_{11}$ are connected to the output of filter $114_{11}$; samplers $113_{21}$ and $113'_{21}$ are connected to the output of filter $114_{21}$ and samplers $113_{31}$ and $113'_{31}$ are connected to the output of filter $114_{31}$.

The sampling pulses applied to samplers $113_{11}$, $113_{21}$, $113_{31}$ of demodulator unit $110_1$, to samplers $113_{12}$, $113_{22}$, $113_{32}$ of demodulator unit $110_2$ and the samplers $113_{13}$, $113_{23}$, $113_{33}$ of demodulator unit $110_3$ are derived from in-phase pulse generator 102, identical with in-phase pulse generator 2. The sampling pulses applied to samplers $113'_{11}$, $113'_{21}$, $113'_{31}$ and to the similar samplers in demodulator units $110_2$ and $110_3$ are derived from phase-quadrature pulse generator 103, identical with phase-quadrature pulse generator 3. Both generators 102 and 103 are driven by time-base 101 synchronous with master time-base 1. For synchronization purpose, a signal is sent by time-base 1 to time-base 101 and this signal is assumed to be positively outside the bandwidth occupied by the frequency sub-channels. It passes through buffer amplifiers $5_4$ and $105_4$.

Demodulator unit $110_1$ has six outputs, the first three $111_{11}$, $111_{21}$, $111_{31}$ being relative to samples produced by means of unit impulses and the latest three $111'_{11}$, $111'_{21}$, $111'_{31}$ being relative to samples produced by means of doublet unit impulses. The reference numerals of the outputs of demodulator unit $110_2$ are derived from the reference numerals of the outputs of demodulator unit $110_1$ by substituting second subscript 2 for second subscript 1 and those of demodulator unit $110_3$ by substituting second subscript 3 for second subscript 1.

The eighteen outputs of demodulators $110_1$, $110_2$, $110_3$ are connected to a matrix network 20 which has six outputs $211_1$, $211_2$, $211_3$, $211'_1$, $211'_2$, $211'_3$ corresponding respectively to inputs $11_1$, $11_2$, $11_3$, $11'_1$, $11'_2$, $11'_3$.

The use of two types of orthogonal sampling pulses being merely a means for doubling the number of independent communication channels, the channels the information signals of which are sampled by doublet unit impulses will be provisionally disregarded.

Let us assume that filters $13_1$, $13_2$ and $13_3$ of the modulator units and filters $113_{11}$, $113_{21}$, $113_{31}$, $113_{12}$, $113_{22}$, $113_{32}$, $113_{13}$, $113_{23}$, $113_{33}$ of the demodulator units are R-L-C circuits having the same attenuation factor $R/2L=\alpha$ and central angular frequencies $\omega_1$ as regards filters $13_1$, $113_{11}$, $113_{12}$ and $113_{13}$, $\omega_2$ as regards filters $13_2$, $113_{21}$, $113_{22}$ and $113_{23}$ and $\omega_3$ as regards filters $13_3$, $113_{31}$, $113_{32}$ and $113_{33}$.

The response of filter $13_1$ to a short pulse of amplitude $x_{11}$ may be considered as the response to $x_{11}S_0(t)$, where $S_0(t)$ is the unit impulse. The Laplace transform of said response is:

$$F_{1;1}(p)=\frac{x_{11}\omega_1}{(p+\alpha)^2+\omega_1^2}$$

The inverse Laplace transform (time-expression of the output signal) is:

$$f_{1;1}(t)=x_{11}e^{-\alpha t}\sin\omega_1 t$$

for $t\geqq 0$ and is equal to zero for $t<0$

The output signal is therefore a signal having $\omega_1$, as its carried angular frequency and a waveform limited by a steep front and a decreasing exponential slope. $1/\alpha$ has the dimension of a time and if it is assumed that a signal can be neglected when it has fallen under a given fraction of its maximum, say for example 40 db, $\frac{1}{100}\ \alpha\tau$ is comprised between two discrete numbers $\nu$ and $(\nu+1)$, $\nu$ being the number of sampling periods occupied by an elementary signal.

The function $f_{1;1}(t)$ may be written more generally:

$$f_{1;k}(t)=x_{1k}a_{1;k}(t) \qquad (1)$$

with $$a_{1;k}(t)=e^{-\alpha[t-(k-1)\tau]}\sin\omega_1[t-(k-1)\tau] \qquad (2)$$

$a_{1;k}$ being equal to zero for $t-(k-1)\tau<0$

In Expressions 1 and 2, the first subscript $i$ has a frequency significance and refers to the input channel order ($i=1, 2, 3$) and the second subscript, after a semicolon, has a time significance and refers to the sampling cycle order. Thus, $x_{1k}$ which is the amplitude of the sample set up in the $i$th input channel and in the $k$th sampling cycle gives rise to the elementary signal $f_{1;k}=x_{1k}a_{1;k}(t)$.

At a given instant $t$ the output signal at terminal $12_1$ of modulator unit $10_1$ is the sum of three elementary signals:

$$f_{1;k}(t)+f_{1;(k+1)}(t)+f_{1;(k+2)}(t)$$

which succeed one another at regular discrete time interval $\tau$ and overlap one another.

Let us consider again the input signal $x_{11}.S_0(t)$ and apply the same in series to filter $14_1$ of central angular frequency $\omega_1$ and filter $114_{21}$ of central angular frequency $\omega_2$. The resulting Laplace transform is:

$$F_{1,2;1}(p)=\frac{\omega_1}{(p+\alpha)^2+\omega_1^2}\times\frac{\omega_2^2}{(p+\alpha)^2+\omega_2^2}x_{11}$$

and the inverse Laplace transform:

$$f_{1,2;1}(t)=x_{11}e^{-\alpha t}\frac{\omega_1\sin\omega_2 t-\omega_2\sin\omega_1 t}{\omega_1^2-\omega_2^2}$$

This equation may be written in a more symmetric form:

$$f_{1,2;1}(t)=x_{11}e^{-\alpha t}\left[-\frac{\sin\frac{\omega_1+\omega_2}{2}t\cos\frac{\omega_1-\omega_2}{2}t}{\omega_1-\omega_2}+\frac{\sin\frac{\omega_1-\omega^2}{2}t\cos\frac{\omega_1+\omega_2}{2}t}{\omega_1-\omega_2}\right]$$

and by neglecting $(\omega_1-\omega_2)$ with respect to $(\omega_1+\omega_2)$, i.e. the first bracketed term with respect to the second:

$$f_{1,2;1}(t)=x_{11}e^{-\alpha t}\frac{\sin\frac{\omega_1-\omega_2}{2}t\cos\frac{\omega_1+\omega_2}{2}t}{\omega_1-\omega_2}$$

which becomes when $\omega_1=\omega_2$, i.e. when the input signal is applied no more to filters $14_1$ and $114_{21}$, but to filters $14_1$ and $114_{11}$ $$f_{1,1;1}(t)=x_{11}e^{-\alpha t}\frac{t}{2}\cos\omega_1 t$$

Let us now consider the general functions $$f_{i,j;k}^{(t)}=x_{ik}e^{-\alpha[t-(k-1)\tau]}\frac{\sin\frac{\omega_i-\omega_j}{2}[t-(k-1)\tau]\cos\frac{\omega_i+\omega_j}{2}[t-(k-1)\tau]}{\omega_i-\omega_j}x_{ik}a_{i,j;k}^{(t)} \qquad (3)$$

$$f_{i,i;k}^{(t)}=x_{ik}e^{-\alpha[t-(k-1)\tau]}\frac{t-(k-1)\tau}{2}\cos\omega_i[t-(k-1)\tau]=x_{ik}a_{i,i;k}^{(t)} \qquad (4)$$

with $$a_{i,j;k}^{(t)}=e^{-\alpha[t-(k-1)\tau]}\frac{\sin\frac{\omega_i-\omega_j}{2}[t-(k-1)\tau]\cos\frac{\omega_i+\omega_j}{2}[t-(k-1)\tau]}{\omega_i-\omega_j} \qquad (5)$$

$$a_{i,i;k}^{(t)}=e^{-\alpha[t-(k-1)\tau]}\frac{t-(k-1)\tau}{2}\cos\omega i[t-(k-1)\tau] \qquad (6)$$

In these formulae, the first subscript relates to the central angular frequency of the transmitter filter, the second subscript, after a comma, relates to the central angular frequency of the receiver filter and the third subscript, after a semicolon, relates to the sampling cycle order.

The composite signal at tap $6_1$ at a given time instant $\tau$ is:

$$(7)\qquad \begin{aligned} Y_1= & f_{1;k}(\tau)+f_{1;(k+1)}(\tau)+f_{1;(k+2)}(\tau)\\ & +f_{2;k}(\tau)+f_{2;(k+1)}(\tau)+f_{2;(k+2)}(\tau)\\ & +f_{3;k}(\tau)+f_{3;(k+1)}(\tau)+f_{3;(k+2)}(\tau)\end{aligned}$$

This last signal is passed through a receiver filter, filter $114_{11}$ for example, and sampled in sampler $113_{11}$ so as to produce sample $y_{11}$. The value of said sample may be derived from Equation 7 by adding the intermediary subscript 1 between the two subscripts of the $f$:

$$\begin{aligned} y_{11}= & f_{1,1;k}^{(\tau)}+f_{1,1;(k+1)}^{(\tau)}+f_{1,1;(k+2)}^{(\tau)}\\ & +f_{2,1;k}^{(\tau)}+f_{2,1;(k+1)}^{(\tau)}+f_{2,1;(k+2)}^{(\tau)}\\ & +f_{3,1;k}^{(\tau)}+f_{3,1;(k+1)}^{(\tau)}+f_{3,1;(k+2)}^{(\tau)}\end{aligned}$$

which may also be written:

$$(8)\qquad \begin{aligned} y_{11}= & x_{1k}a_{1,1;k}^{(\tau)}+x_{1(k+1)}a_{1,1;(k+1)}^{(\tau)}+x_{1(k+2)}a_{1,1;(k+2)}^{(\tau)}\\ & +x_{2k}a_{2,1;}^{(\tau)}+x_{2(k+1)}a_{2,1;(k+1)}^{(\tau)}+x_{2(k+2)}a_{2,1;(k+2)}^{(\tau)}\\ & +x_{3k}a_{3,1;k}^{(\tau)}+x_{3(k+1)}a_{3,1;(k+1)}^{(\tau)}+x_{3(k+2)}a_{3,1;(k+2)}^{(\tau)}\end{aligned}$$

In Equations 7 and 8 the time of transit of the elementary signals over common channel 4 has been assumed equal to $\tau$.

More generally if $q$ is the number of a tap of the delay line, the sample $y_{j,q}$ in demodulator $110_q$ is taken up at the instant $\tau+(q-1)\tau$ and $y_{j,q}$ may be written:

$$(9)\quad y_{j,q}=x_{1k}a_{1,j;k}^{(q\tau)}+x_{1(k+1}a_{1,j;(k+1)}^{(q\tau)}+x_{1(k+2)}a_{1,j;(k+2)}^{(q\tau)}$$
$$+x_{2k}a_{2,j;k}^{(q\tau)}+x_{2(k+1)}a_{2,j;(k+1)}^{(q\tau)}+x_{2(k+2)}a_{2,j;(k+2)}^{(q\tau)}$$
$$+x_{3k}a_{3,j;k}^{(q\tau)}+x_{3(k+1)}a_{3,j;(k+1)}^{(q\tau)}+x_{3(k+2)}a_{3,j;(k+2)}^{(q\tau)}$$

It is to be noticed that, due to the mathematical form of the function $$a_{i,j;k}^{(\tau)}$$

given by Equation 5, the function remains unchanged when simultaneously the argument is increased by an amount $q\tau$ and the third subscript $k$ is decreased by an integral $q$. In other words:

$$a_{i,j;k}^{[\tau+(q-1)\tau]}=a_{i,j;(k-q+1)}^{(\tau)}$$

$a_{1,j;k(k-q)}$ is equal to zero if $k\geqslant q$. Thus (9) may be written:

$$(10)\quad y_{j,q}=\ x_{1k}a_{1,j;(k-q+1)}+x_{1(k+1)}a_{1,j;(k-q+2)}+x_{1(k+2)}a_{1,j;(k-q+3)}$$
$$+x_{2k}a_{2,j;(k-q+1)}+x_{2(k+1)}a_{2,j;(k-q+2)}+x_{2(k+2)}a_{2,j;(k-q+3)}$$
$$+x_{3k}a_{3,j;(k-q+1)}+x_{3(k+1)}a_{3,j;(k-q+2)}+x_{3(k+2)}a_{3,j;(k-q+3)}$$

In Equation 10 argument $\tau$ is not written but implied.

Finally by making $k=1$, $j=1, 2, 3$, $q=1, 2, 3$, it is found the matricial equation $$\begin{vmatrix}y_{11}\\y_{12}\\y_{13}\\y_{21}\\y_{22}\\y_{23}\\y_{31}\\y_{32}\\y_{33}\end{vmatrix}=||a||\times\begin{vmatrix}x_{11}\\x_{12}\\x_{13}\\x_{21}\\x_{22}\\x_{23}\\x_{31}\\x_{32}\\x_{33}\end{vmatrix}$$

where

The function $a_{1,j;k}$ becomes by stating $\omega_i=n\alpha\pi$ and $\omega_j=m\alpha\pi$ $$a_{i,j;k}=e^{-k}\sin\left[(n-m)k\pi/2\right]\cos\left[(n+m)k\pi/2)\right]$$
$$=e^{-k}\frac{1}{2(n-m)\alpha\pi}(\sin nk\pi-\sin mk\pi)$$

which is equal to zero whichever be $k$.

Further, let us assume that $n$ being even:

$$\omega_1=n\alpha\pi$$
$$\omega_2=(n+1)\alpha\pi$$
$$\omega_3=(n+2)\alpha\pi$$

That is the minimal frequency spacing $$\Delta f=\frac{(\omega_2-\omega_1)}{2\pi}=\frac{(\omega_3-\omega_2)}{2\pi}$$

between the center frequencies of two adjacent band-filters is equal to $$\frac{\alpha}{2}=\frac{1}{2\tau}\text{ or }:\Delta f.\tau=\frac{1}{2}$$

then matrix (11) becomes $$(13)\quad ||a||=\frac{1}{2\alpha e}\begin{Vmatrix}1&\frac{2}{e}&\frac{3}{e^2}&0&0&0&0&0&0\\0&1&\frac{2}{e}&0&0&0&0&0&0\\0&0&1&0&0&0&0&0&0\\0&0&0&-1&\frac{2}{e}&-\frac{3}{e^2}&0&0&0\\0&0&0&0&-1&\frac{2}{e}&0&0&0\\0&0&0&0&0&-1&0&0&0\\0&0&0&0&0&0&1&\frac{2}{e}&\frac{3}{e^2}\\0&0&0&0&0&0&0&1&\frac{2}{e}\\0&0&0&0&0&0&0&0&1\end{Vmatrix}$$

$$(11)\quad ||a||=\begin{Vmatrix}a_{1,1;1}&a_{1,1;2}&a_{1,1;3}&a_{2,1;1}&a_{2,1;2}&a_{2,1;3}&a_{3,1;1}&a_{3,1;2}&a_{3,1;3}\\a_{1,1;0}&a_{1,1;1}&a_{1,1;2}&a_{2,1;0}&a_{2,1;1}&a_{2,1;2}&a_{3,1;0}&a_{3,1;1}&a_{3,1;2}\\a_{1,1;-1}&a_{1,1;0}&a_{1,1;1}&a_{2,1;-1}&a_{2,1;0}&a_{2,1;1}&a_{3,1;-1}&a_{3,1;0}&a_{3,1;1}\\a_{1,2;1}&a_{1,2;2}&a_{1,2;3}&a_{2,2;1}&a_{2,2;2}&a_{2,2;3}&a_{3,2;1}&a_{3,2;2}&a_{3,2;3}\\a_{1,2;0}&a_{1,2;1}&a_{1,2;2}&a_{2,2;0}&a_{2,2;1}&a_{2,2;2}&a_{3,2;0}&a_{3,2;1}&a_{3,2;2}\\a_{1,2;-1}&a_{1,2;0}&a_{1,2;1}&a_{2,2;-1}&a_{2,2;0}&a_{2,2;1}&a_{3,2;-1}&a_{3,2;0}&a_{3,2;1}\\a_{1,3;1}&a_{1,3;2}&a_{1,3;3}&a_{2,3;1}&a_{2,3;2}&a_{2,3;3}&a_{3,3;1}&a_{3,3;2}&a_{3,3;3}\\a_{1,3;0}&a_{1,3;1}&a_{1,3;2}&a_{2,3;0}&a_{2,3;1}&a_{2,3;2}&a_{3,3;0}&a_{3,3;1}&a_{3,3;2}\\a_{1,3;-1}&a_{1,3;0}&a_{1,3;1}&a_{2,3;-1}&a_{2,3;0}&a_{2,3;1}&a_{3,3;-1}&a_{3,3;0}&a_{3,3;1}\end{Vmatrix}$$

The general function $a_{i,j;k}$ may be simplified in order to achieve the calculation. The sampling instant $t$ may be so selected that the functions $a_{1,1;k}$ be maximum. This function being the product of the two functions ½ $t\,e^{-\alpha t}$ and $\cos\omega_1 t$, one may select for maximum of the product the product of the maxima of the two functions. This gives $$t=\tau=\frac{1}{\alpha}$$

$$\cos\frac{\omega_1}{\alpha}=\pm1$$

whence $$\omega_1=n\alpha\pi$$

Thus the function $a_{1,1;k}$ may be written $$(12)\quad a_{i,i;k}=\frac{ke^{-k}}{2\alpha}\cos kn\pi$$

which gives:

$$a_{i,i;1}=\frac{1}{2\alpha e}\quad a_{i,i;2}=\frac{1}{2\alpha e}\times\frac{2}{e}\quad a_{i,i;3}=\frac{1}{2\alpha e}\times\frac{3}{e^2}$$

which is a matrix degenerated into three sub-matrices, two of which are identical, as follows:

$$\begin{Vmatrix}y_{11}\\y_{12}\\y_{13}\end{Vmatrix}=\frac{1}{2\alpha e}\begin{Vmatrix}1&\frac{2}{e}&\frac{3}{e^2}\\0&1&\frac{2}{e}\\0&0&1\end{Vmatrix}\times\begin{Vmatrix}x_{11}\\x_{12}\\x_{13}\end{Vmatrix}$$

$$\begin{Vmatrix}y_{21}\\y_{22}\\y_{23}\end{Vmatrix}=\frac{1}{2\alpha e}\begin{Vmatrix}-1&\frac{2}{e}&-\frac{3}{e^2}\\0&-1&\frac{2}{e}\\0&0&-1\end{Vmatrix}\times\begin{Vmatrix}x_{21}\\x_{22}\\x_{23}\end{Vmatrix}$$

$$\begin{Vmatrix}y_{31}\\y_{32}\\y_{33}\end{Vmatrix}=\frac{1}{2\alpha e}\begin{Vmatrix}1&\frac{2}{e}&\frac{3}{e^2}\\0&1&\frac{2}{e}\\0&0&1\end{Vmatrix}\times\begin{Vmatrix}x_{31}\\x_{32}\\x_{33}\end{Vmatrix}$$

By inverting these three matrices, according to Cramer's rule (inverse matrix=adjugate matrix divided by the determinant of the matrix), one finds:

$$(14a)\quad \begin{Vmatrix} x_{11} \\ x_{12} \\ x_{13} \end{Vmatrix} = 2ae \begin{Vmatrix} 1 & -\frac{2}{e} & \frac{1}{e^2} \\ 0 & 1 & -\frac{2}{e} \\ 0 & 0 & 1 \end{Vmatrix} \times \begin{Vmatrix} y_{11} \\ y_{12} \\ y_{13} \end{Vmatrix}$$

$$(14b)\quad \begin{Vmatrix} x_{21} \\ x_{22} \\ x_{23} \end{Vmatrix} = -2ae \begin{Vmatrix} 1 & \frac{2}{e} & \frac{1}{e^2} \\ 0 & 1 & \frac{2}{e} \\ 0 & 0 & 1 \end{Vmatrix} \times \begin{Vmatrix} y_{21} \\ y_{22} \\ y_{23} \end{Vmatrix}$$

$$(14c)\quad \begin{Vmatrix} x_{31} \\ x_{32} \\ x_{33} \end{Vmatrix} = 2ae \begin{Vmatrix} 1 & -\frac{2}{e} & \frac{1}{e^2} \\ 0 & 1 & -\frac{2}{e} \\ 0 & 0 & 1 \end{Vmatrix} \times \begin{Vmatrix} y_{31} \\ y_{32} \\ y_{33} \end{Vmatrix}$$

Matrix 20 of FIG. 2 has as its crosspoints resistors which are proportional to the terms of the first line of matrices (14*a*) to (14*c*). In the simplified case chosen as example, matrix 20 is shown as a detriment in FIG. 5. This detriment degenerates into three submatrices. It comprises nine tubes $\mathbf{200}_{11}$ to $\mathbf{200}_{13}$, $\mathbf{200}_{21}$ to $\mathbf{200}_{23}$ and $\mathbf{200}_{31}$ to $\mathbf{200}_{33}$ having their grids connected to the nine inputs of the matrix, $\mathbf{111}_{11}$ to $\mathbf{111}_{13}$, $\mathbf{111}_{21}$ to $\mathbf{111}_{23}$, $\mathbf{111}_{31}$ to $\mathbf{111}_{33}$. Each tube has an anode resistor and a cathode resistor so as to operate as a phase-inverter tube and the output is taken from the cathode load when the term of the matrix is positive and from the anode load when the term of the matrix is negative.

Resistors $\mathbf{220}_{11}$, $\mathbf{220}_{12}$, $\mathbf{220}_{13}$ on the one hand and resistors $\mathbf{220}_{21}$, $\mathbf{220}_{22}$, $\mathbf{220}_{23}$ on the other hand, $\mathbf{220}_{31}$, $\mathbf{220}_{32}$, $\mathbf{220}_{33}$ at least are respectively proportional to 1, $$\frac{e}{2}=1.359$$

and $e^2=7.389$. For example:

| | Ohms |
|---|---|
| Cathode resistors of the nine tubes | 1000 |
| Anode resistors of the nine tubes | 1000 |
| Resistors $\mathbf{220}_{11}$, $\mathbf{220}_{21}$, $\mathbf{220}_{31}$ | 100,000 |
| Resistors $\mathbf{220}_{12}$, $\mathbf{220}_{22}$, $\mathbf{220}_{32}$ | 135,900 |
| Resistors $\mathbf{220}_{13}$, $\mathbf{220}_{23}$, $\mathbf{220}_{33}$ | 738,900 |

The voltages across the crosspoint resistors are added by means of adding resistors 221, 222 and 223. There is obtained a sequence of samples $x_{11}$, $x_{12}$, $x_{13}$ . . . at terminal $\mathbf{211}_1$, a sequence of samples $x_{21}$, $x_{22}$, $x_{23}$ . . . at terminal $\mathbf{211}_2$ and a sequence of samples $x_{31}$, $x_{32}$, $x_{33}$ . . . at terminal $\mathbf{211}_3$. The sample pulses are demodulated by low-pass filters 224.

The receiver system described in connection with FIG. 2 systematically features a desired symmetry with respect to the transmitter system illustrated in FIG. 1. It is considered that such a representation facilitates a good understanding of the operation of the communication system which essentially comprises, at the transmitting set, sampling a plurality of communication signals, applying the samples to filters having pass-bands frequency-overlapping one another and attenuation constant small enough to transform the samples applied thereto into elemental signals time-overlapping each other, and sending said elementary signals over a single communication channel and, at the receiving set, delaying the received elementary signals by successive multiples of the sampling period, passing the non-delayed and delayed signals through reception filters identical to the transmission filters, sampling at the same rate as in the transmitting set the elementary signals non-delayed and filtered and delayed and filtered, and finally linearly combining the sampled elementary signals.

The receiver system illustrated in FIG. 4 comprises three sine oscillators $\mathbf{31}_1$, $\mathbf{31}_2$ and $\mathbf{31}_3$ driven by the synchronized time base 101 which respectively oscillate at angular frequencies $\omega_1$, $\omega_2$ and $\omega_3$. Oscillator $\mathbf{31}_1$ is connected to two phase-shifters $\mathbf{32}_1$ and $\mathbf{33}_1$ which respectively produce in-phase and phase-quadrature signals. In the same way oscillators $\mathbf{31}_2$ and $\mathbf{33}_2$ are respectively connected to phase-shifters $\mathbf{32}_2$ and $\mathbf{33}_2$ and to phase-shifters $\mathbf{32}_3$ and $\mathbf{33}_3$.

As in the case of FIG. 2, common channel 4 is connected to the input of delay line 6 which is provided with three taps $\mathbf{6}_1$, $\mathbf{6}_2$, $\mathbf{6}_3$. Said taps are respectively connected to input terminals $\mathbf{312}_1$, $\mathbf{312}_2$, $\mathbf{312}_3$ of demodulator units $\mathbf{310}_1$, $\mathbf{310}_2$, $\mathbf{310}_3$.

Each demodulator unit, $\mathbf{210}_2$ for example, comprises six amplitude demodulators $\mathbf{313}_{12}$, $\mathbf{313'}_{12}$, $\mathbf{313}_{22}$, $\mathbf{313'}_{22}$, $\mathbf{313}_{32}$, $\mathbf{313'}_{32}$. These demodulators may be conventional, of the ring-type for example. All the demodulators of a given demodulator unit are fed by the elementary signal available at the corresponding tape of the delay line. Besides, demodulator $\mathbf{313}_{12}$ is fed by the output signal of phase-shifter $\mathbf{32}_1$, demodulator $\mathbf{313'}_{12}$ is fed by the output signal of phase-shifter $\mathbf{33}_1$, demodulator $\mathbf{313}_{22}$ is fed by the output signal of phase-shifter $\mathbf{32}_2$, demodulator $\mathbf{313'}_{22}$ is fed by the output signal of phase-shifter $\mathbf{33}_2$, demodulator $\mathbf{313}_{32}$ is fed by the output signal of phase-shifter $\mathbf{32}_3$ and demodulator $\mathbf{313'}_{32}$ is fed by the output signal of phase-shifter $\mathbf{33}_3$.

To demodulators $\mathbf{313}_{12}$ and $\mathbf{313'}_{12}$ are connected low-pass filters $\mathbf{324}_{12}$ and $\mathbf{324'}_{12}$, to demodulators $\mathbf{313}_{22}$ and $\mathbf{313'}_{22}$ are connected low-pass filters $\mathbf{324}_{22}$ and $\mathbf{324'}_{22}$ and to demodulators $\mathbf{313}_{32}$ and $\mathbf{313'}_{32}$ are connected low-pass filters $\mathbf{324}_{32}$ and $\mathbf{324'}_{32}$. The six filters have terminals $\mathbf{311}_{12}$ $\mathbf{311'}_{12}$, $\mathbf{311}_{22}$, $\mathbf{311'}_{22}$ $\mathbf{311}_{32}$, $\mathbf{311'}_{32}$ which are connected to the input terminals of matrix network 20 and respectively correspond to terminal $\mathbf{111}_{12}$, $\mathbf{111'}_{12}$, $\mathbf{111}_{22}$, $\mathbf{111'}_{22}$, $\mathbf{111}_{32}$, $\mathbf{111'}_{32}$.

It should be understood that, despite the difference of structure, each demodulator network of FIG. 5 performs the same operation as a demodular network of FIG. 2. In the latter case, three sub-channels are obtained by separating the input signal on terminal $\mathbf{6}_1$ by means of band filters $\mathbf{114}_{11}$, $\mathbf{114}_{21}$ and $\mathbf{114}_{31}$, and each of them in turn provides two separate output signals, one through an in-phase demodulator, the second through a phase-quadrature demodulator. There are only two demodulating signals, namely unit impulses 152 and double unit impulses 153.

In the case of FIG. 4, separating filters are omitted in the demodulator network, but six demodulating signals are provided, which are the output signals of phase-shifters $\mathbf{32}_1$, $\mathbf{33}_1$, $\mathbf{32}_2$, $\mathbf{33}_2$, $\mathbf{32}_3$, $\mathbf{33}_3$. The operation of the frequency distribution of these signals taken by two is the same as that of filters $\mathbf{114}_{11}$, $\mathbf{114}_{21}$ and $\mathbf{114}_{31}$.

As a result of the network in FIG. 4, a low-pass filter such as $\mathbf{324}_{12}$ is responsive only to input signals on terminal $\mathbf{6}_2$ in the frequency band of the output signal of phase-shifter $\mathbf{32}_1$ that is in the frequency band of filter $\mathbf{114}_{11}$.

Synchronized time-base 101 and synchronized sinusoidal oscillators $\mathbf{31}_1$, $\mathbf{31}_2$, $\mathbf{31}_3$ are known in the art. Examples of sinusoidal oscillators synchronized with a sinusoidal signal, often called locked oscillators, are described in the textbook "Pulse and Digital Circuits," by Jacob Millman and Herbert Taub, McGraw-Hill Book Co., Inc., paragraph 12.11, pages 384 to 386 and particularly Fig. 12.21. They generally comprise a stable sinusoidal oscillator having a tank circuit, a reactance tube connected across the oscillator tank and a phase comparator suitable for comparing the phases of the sinusoidal signal produced by the oscillator and the synchronizing sinusoidal signal, the output D.C. signal of said comparator being used for varying the bias of the reactance tube. A locked oscillator can be used as a frequency divider and when controlled by a nominally sinusoidal synchronizing signal of frequency $f_s$ nearly equal to $n$ times ($n$=an integer) its natural frequency $f_1$, the oscillator frequency will change from $f_1$ to $f_s/n$ and thereafter will run synchronously with the injected signal. Thus a locked oscillator may be easily synchronized at frequencies which are sub-multiples of the frequency of the synchronizing signal.

In the system described in detail in the foregoing, the frequency channel overlapping ratio and the ratio between the elementary signal duration and the sampling cycle duration overlapping ratio were both equal to three. More generally if $\mu$ is the frequency overlapping ratio and $\nu$ the ratio between the elementary signal duration and the sampling cycle duration, there would be $\mu$ modulator units such as $10_1$ in the transmitting set of FIG. 1, $\nu$ taps in the delay-line 6 and $\mu$ filters per each demodulator unit of FIG. 2. The square matrix (11) would have $\mu\nu$ lines and columns. As it results from the foregoing, $\mu$ and $\nu$ are independent parameters since $\mu$ depends upon both the spacing between the carrier frequencies, that is the center frequencies of the band-filters, and the bandwidths of the same and $\nu$ depends upon both the attenuation constant of the filters and the sampling cycle duration. The relations:

$$\omega_1 = n\alpha\pi = n\pi/\tau$$
$$\omega_2 = (n+1)\alpha\pi = (n+1)\pi/\tau$$
$$\omega_3 = (n+2)\alpha\pi = (n+2)\pi/\tau$$

which relate the angular carrier frequencies to the sampling period in the embodiment of the invention for which the matrix terms were calculated are only assumed for making easier the calculation of said terms.

What I claim is:

1. A multiplex system comprising means for simultaneously and recurrently sampling a plurality of $\mu$ modulation signals and producing input recurrent modulated sample pulses, a plurality of $\mu$ first resonant symmetrical band-filter means having center frequencies spaced apart from one another and frequency pass-bands over-lapping one another, said plurality of first resonant symmetrical band-filter means being equal in number to said modulation signal plurality, means for respectively applying said input recurrent modulated sample pulses to said first band-filter means and deriving therefrom elementary signals, said elementary signals having respectively as their carrier frequencies the center frequencies of said first band-filter means, as their bandwidths the pass-bands thereof and a time-duration comprised between $\nu$ and $(\nu+1)$ times the recurrence period of said recurrent modulated sample pulses, means for adding the elementary signals derived from said first band-filter means and applying the resultant signal to a single communication channel, a delay line connected to said communication channel and having taps for distributing said resultant signal into $\nu$ delay line outputs, a plurality of $\mu$ second resonant symmetrical band-filter means respectively identical to said first resonant symmetrical band-filter means, connected in parallel to each of said $\nu$ delay line outputs, means for sampling the output signals of said $\mu\nu$ second resonant symmetrical band-filter means and deriving therefrom output recurrent samples whereby said $\mu\nu$ output recurrent samples are related to $\mu\nu$ input samples pulses applied at $\nu$ recurrent sampling cycles to $\mu$ first band-filter means by a matrical constant coefficient relationship, and matrix means having $\mu\nu$ lines connected to said second output sampling means and $\mu$ columns and crosspoint elements proportional to said constant coefficients, whereby the modulation signals are restored at the outputs of said columns.

2. A multiplex system including a transmitter comprising a first time-base, a first generator of in-phase unit pulses and a first generator of phase-quadrature doublet unit pulses driven by said first time-base, means for applying to said transmitter a plurality of $2\mu$ modulation signals individually issued from independent signal sources, means for simultaneously and recurrently sampling the $\mu$ modulation signals from one half of said sources with the in phase unit pulses and producing input the current modulated sample pulses and $\mu$ modulation signals from the other half of said sources with the phase-quadrature doublet unit pulses and producing input recurrent modulated sample doublet pulses, a plurality of $\mu$ first resonant symmetrical band-filter means having center frequencies spaced apart from one another and frequency pass-bands overlapping one another, means for respectively applying said input recurrent modulated sample pulses and said input recurrent modulated sample doublet pulses to said first band-filter means and deriving therefrom elementary signals, said elementary signals having respectively as their carrier frequencies the center frequencies of said first band-filter means, as their bandwidths the pass-bands thereof, a time duration comprised between $\nu$ and $(\nu+1)$ times the recurrence period of said recurrent modulated sample pulses and sample doublet pulses and the carrier of an elementary signal derived from a sample pulse through a given first band-filter means being in phase-quadrature with respect to the carrier of an elementary signal derived from a sample doublet pulse through the same first band-filter means, means for adding the elementary signals derived from said first band-filter means and applying the resultant signal to a single communication channel and a receiver comprising a second time-base synchronized with the first time-base, a delay line connected to said communication channel and having taps for distributing said resultant signal into $\nu$ delay line outputs, a plurality of $\mu$ second resonant symemtrical band filter means respectively identical to said first resonant symmetrical band-filter means, connected in parallel to each of said $\nu$ delay line outputs, a second generator of in-phase unit pulses and a second generator of phase-quadrature doublet unit pulses driven by said second time-base, means for simultaneously and recurrently sampling the output signals of said $\mu\nu$ second resonant symmetrical band-filter means by the unit pulses produced by said second in-phase unit pulse generator and deriving therefrom output recurrent in-phase samples whereby said $\mu\nu$ output recurrent in-phase samples are related to $\mu\nu$ input sample pulses applied at $\nu$ recurrent sampling cycles to $\mu$ first band-filter means by a first matrical constant coefficient relationship, means for simultaneously and recurrently sampling the output signals of said $\mu\nu$ second resonant band-filter means by the doublet unit pulses produced by said second phase quadrature doublet unit pulse generator and deriving therefrom output recurrent phase-quadrature samples whereby said $\mu\nu$ output recurrent phase-quadrature samples are related to $\mu\nu$ input sample doublet pulses by a second matrical constant coefficient relationship, a first matrix means having $\mu\nu$ lines connected to said in-phase output sampling means and $\mu$ columns and crosspoints elements respectively proportional to the coefficients of said first matrical relationship whereby a first set of $\mu$ modulation signals are restored at the outputs of the columns of said first matrix means and a second matrix means having $\mu\nu$ lines connected to said phase-quadrature output sampling means and $\mu$ columns and crosspoints elements respectively proportional to the coefficients of said second matrical relationship whereby a second set of $\mu$ modulation signals are restored at the outputs of the columns of said second matrix means.

3. A multiplex system comprising means for simultaneously and recurrently sampling with a recurrence period $\tau$ a plurality of modulation signals and producing input recurrent modulated sample pulses, a plurality of $\mu$ first resonant symmetrical band-filter means having center frequencies spaced apart from one another by a frequency interval $\Delta f$ related to the recurrence period by the relationship $\tau\Delta f = \frac{1}{2}$ and frequency pass-bands overlapping one another, said plurality of first resonant symmetrical band-filter means being equal in number to said modulation signal plurality, means for respectively applying said input recurrent modulated sample pulses to said first band-filter means and deriving therefrom elementary signals, said elementary signals having respectively as their carrier frequencies the center frequencies of said first band-filter means, as their bandwidths the pass-bands thereof and a time-duration comprised between $\nu$ and $(\nu+1)$ times the recurrence period of said recurrent modulated sample pulses, means for adding the elementary signals derived from said first band-filter means and applying the resultant signal to a single communication channel, a delay line connected to said communication channel and having taps for distributing said resultant signal into $\nu$ delay line outputs, a plurality of $\mu$ second resonant symemtrical band-filter means respectively identical to said first resonant symmetrical band-filter means, connected in parallel to each of said $\nu$ delay line outputs, means for sampling the output signals of said $\mu\nu$ second resonant symmetrical band-filter means and deriving therefrom output recurrent samples whereby $\mu\nu$ output recurrent samples are related to $\mu\nu$ input samples pulses applied at $\nu$ recurrent sampling cycles to $\mu$ first band-filter means by a matrical constant coefficient relationship, and matrix means having $\mu\nu$ lines connected to said second output sampling means and $\mu$ columns and crosspoint elements proportional to said constant coefficients, whereby the modulation signals are restored at the outputs of said columns.

4. A multiplex system including a transmitter comprising a first time-base, a first generator of in-phase unit pulses and a second generator of phase-quadrature doublet unit pulses driven by said first time-base, means for applying to said transmitter a plurality of $2\mu$ modulation signals individually issued from independent signal sources, means for simultaneously and recurrently sampling with a recurrence period $\tau$ the $\mu$ modulation signals from one half of said sources with the in-phase unit pulses and producing input recurrent modulated sample pulses and the $\mu$ modulation signals from the other half of said sources with the phase-quadrature doublet unit pulses and producing input recurrent modulated sample doublet pulses, a plurality of $\mu$ first resonant symmetrical band-filter means having center frequencies spaced apart from one another by a frequency interval $\Delta f$ and frequency pass-bands overlapping one another, means for respectively applying said input recurrent modulated sample pulses and said input recurrent modulated sample doublet pulses to said first band-filter means and deriving therefrom elementary signals, said elementary signals having respectively as their carrier frequencies the center frequencies of said first band-filter means, as their bandwidths the pass-bands thereof, a time duration comprised between $\nu$ and $(\nu+1)$ times the recurrence period of said recurrent modulated sample pulses and sample doublet pulses and the carrier of an elementary signal derived from a sample pulse through a given first band-filter means being in phase quadrature with respect to the carrier of an elementary signal derived from a sample doublet pulse through the same first band-filter means, means for adding the elementary signals derived from said first band-filter means and applying the resultant signal to a single communication channel and a receiver comprising a second time-base synchronized with the first time-base, a delay line connected to said communication channel and having taps for distributing said resultant signal into $\nu$ delay line outputs, a plurality of $\mu$ second resonant symmetrical band-filter means respectively identical to said first resonant symmetrical band-filter means, connected in parallel to each of said $\nu$ delay line outputs, a second generator of in-phase unit pulses and a second generator of phase-quadrature doublet unit pulses driven by said second time-base, means for simultaneously and recurrently sampling the output signals of the said $\mu\nu$ second resonant symmetrical band-filter means by the unit pulses produced by said second in-phase unit pulse generator and deriving therefrom output recurrent in-phase samples whereby said $\mu\nu$ output recurrent in-phase samples are related to $\mu\nu$ input sample pulses applied at $\nu$ recurrent sampling cycles to $\mu$ first band-filter means by a first matrical constant coefficient relationship, means for simultaneously and recurrently sampling the output signals of said $\mu\nu$ second resonant band-filter means by the doublet unit pulses produced by said second phase-quadrature doublet unit pulse generator and deriving therefrom output recurrent phase-quadrature samples whereby said $\mu\nu$ output recurrent phase-quadrature samples are related to $\mu\nu$ input sample doublet pulses by a second matrical constant coefficient relationship, a first matrix means having $\mu\nu$ lines connected to said in-phase output sampling means and $\mu$ columns and crosspoints elements respectively proportional to the coefficients of said first matrical relationship whereby a first set of $\mu$ modulation signals are restored at the outputs of the columns of said first matrix means and a second matrix means having $\mu\nu$ lines connected to said phase-quadrature output sampling means and $\mu$ columns and crosspoints elements respectively proportional to the coefficients of said second matrical relationship whereby a second set of $\mu$ modulation signals are restored at the outputs of the columns of said second matrix means.

References Cited by the Examiner

UNITED STATES PATENTS 2,635,140 4/53 Dome ---------------- 179—15.55

2,870,247 1/59 Cherry ---------------- 179—15

DAVID G. REDINBAUGH, *Primary Examiner.*